United States Patent Office 3,006,445
Patented Oct. 31, 1961

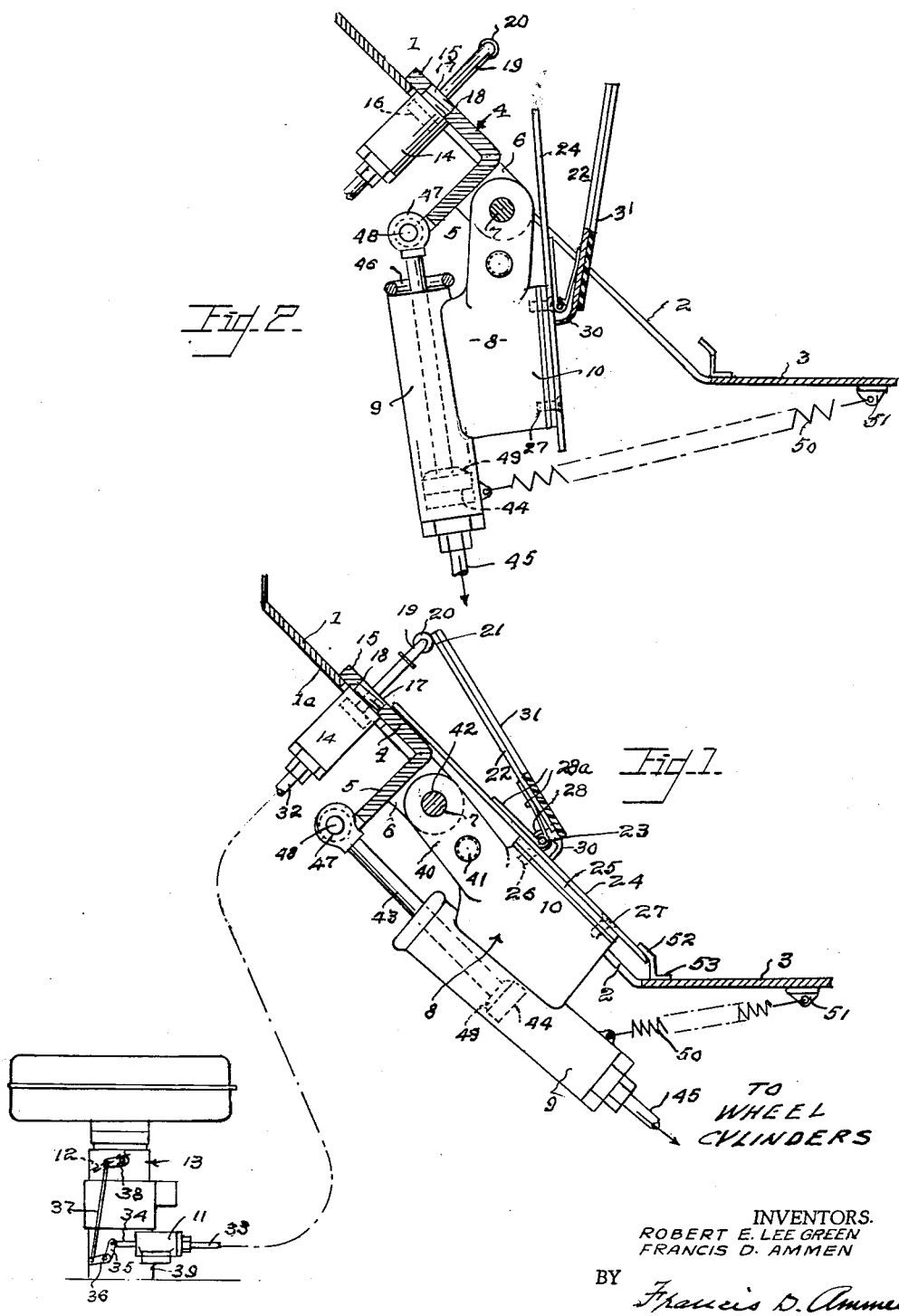

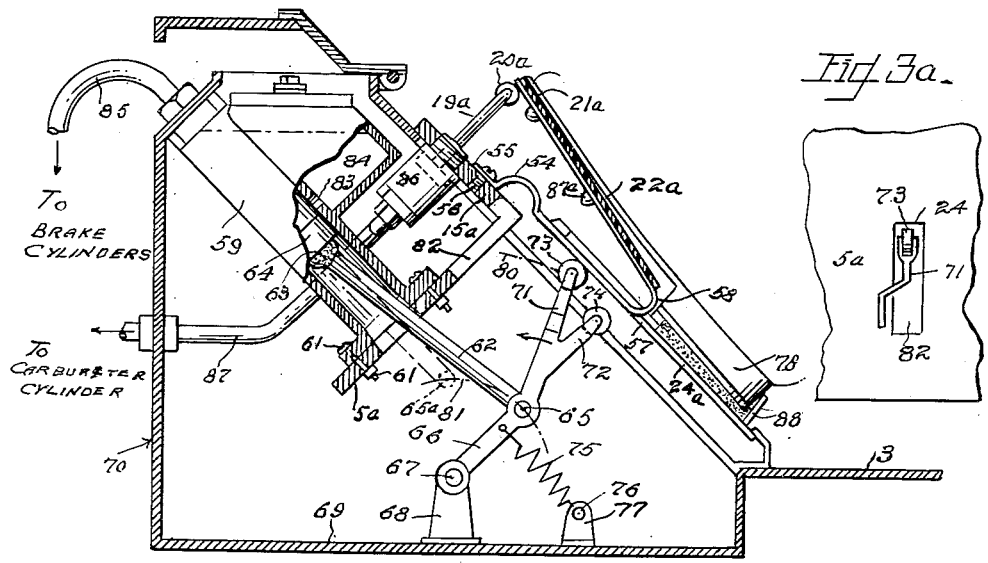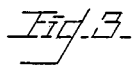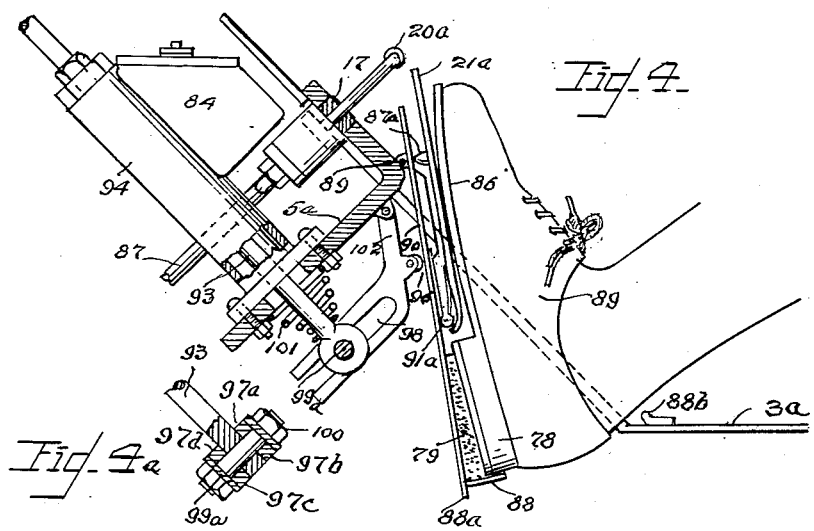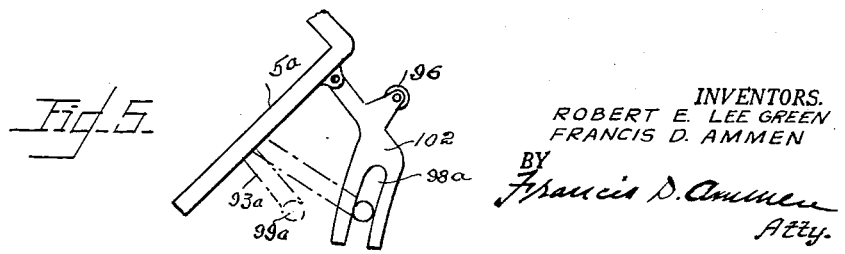

3,006,445
COMBINED ACCELERATOR AND BRAKE
CONTROL MECHANISM
Robert E. Lee Green, Pomona, Calif. (1137 24th St., Santa Monica, Calif.), and Francis D. Ammen, Los Angeles, Calif.; said Ammen assignor to said Green
Filed June 2, 1958, Ser. No. 739,321
13 Claims. (Cl. 192—3)

This invention relates to the driving of vehicles such as automobiles, trucks or the like.

The means in cars for accelerating automobiles and applying the brakes, employed in present practice involves the complete independence of the accelerating mechanism from the brake mechanism; that is to say, these mechanisms are not only completely independent of each other, but each mechanism has its own control member which is usually a lever in the form of a pedal mounted so as to be accessible just above the foot board of the car.

It is a fact that in many cars, when the chance of a collison arises, or the danger of striking a pedestrian, the car that may cause the accident is moving forward at a high rate of speed, often too high for safety. The situation is frequently such as to necessitate the driver immediately shifting his foot laterally from the accelerator pedal to the brake pedal. This requires a certain amount of time, when even a fraction of a second should be saved if possible to do so.

An object of the present invention is to provide mechanism combining the means for controlling the accelerator lever or pedal and the means for applying the brake without necessitating the shifting of the driver's foot laterally to place it on the pedal that operates the brakes.

In order to accomplish this the mechanism about to be described includes two levers, which have an alignment with respect to each other that enables the driver's foot to be constantly in contact with the two levers referred to, and this alignment enables the lever that controls the accelerator of the car to be actuated by the toe of the driver's shoe, and the lever that actuates and controls the application of the brakes is under the heel of the shoe, the organization of these parts being such that when the brakes are in the act of being applied, any further application of the accelerator lever becomes temporarily inhibited.

In this way, a driver who reacts quickly to a dangerous situation requires actually no time for preparing to apply the brakes, he is "all set" to do so, because he merely presses his heel forcibly down onto the brake lever. This applies the brakes to the exclusion of interference by the mechanism for applying the accelerator means.

Another object of the invention is to provide an organization of these two dual control mechanisms that facilitates their being carried on a common casing which is self contained and capable of being mounted and set in place for operation by introducing the same through an opening in the foot board of the car.

In practice, the casing that houses the inner framing employed within the same, will be designed and constructed with regard to the features of design and construction of the car into which the unit is to be introduced, including the opening in the foot boards, and location of parts of the car model in which this dual control mechanism is to be installed.

Another object of the invention is to provide a fluid pressure system actuated by the accelerator lever or pedal for controlling the valve such as is usually associated with the carbureter of a car to enable the depressing movement of the accelerator pedal to set the valve to supply the motor with required amount of fuel.

Further objects of the invention will become evident from a careful reading of the following specification and study of the accompanying drawing.

The invention consists in the novel parts and combinations of parts to be described hereinafter, all of which contribute to produce an efficient combined accelerator and brake control mechanism.

A preferred embodiment of the invention is described in the following specification, while the broad scope of the invention is pointed out in the appended claims.

In the drawing:

FIGURE 1 is a longitudinal section in a vertical plane and parallel to the longitudinal axes of the accelerator lever and the brake lever. This view shows a portion of the inclined foot board having the opening within which the operating parts of the accelerator system and brake mechanism lie, including means for developing the fluid pressure for actuating the wheel brake cylinders. This view also shows diagrammatically the hose connection from the pressure developing means that maintains communication with a pressure actuated means for controlling the valve that furnishes the fuel to the motor. This view shows these parts in their position of rest.

FIGURE 2 is a view somewhat similar to FIGURE 1 but shows the parts in the relation they have when the brake lever is in the position it has when the brakes are applied. It illustrates how the accelerator pedal lever is withdrawn from the stem that it normally controls while the car is being driven forward.

FIGURE 3 is a section showing another embodiment of the invention, including the casing, and illustrates the relation of the parts when they are at rest; and particularly illustrating the means for transmitting motion from the brake to the master cylinder of a hydraulic brake system.

FIGURE 3a is a fragmentary view indicating the means for establishing clearance for a starting arm of the "lever means" that initiates advances of the piston that finally develop the working pressure that is finally communicated to the wheel brake cylinders. This view shows the mechanism at rest, set for starting to drive the car forward, or to apply the brakes.

FIGURE 4 is also a sectional view of the same general nature as FIGURE 3, but illustrating another embodiment of the mechanism with the driver's foot in the position it has when applying the brakes. At this time the accelerator lever and the brake lever are pressed into close relationship to each other. This view indicates the end of the accelerator lever removed from operating contact with the piston rod of the master cylinder, that develops the pressure that is communicated to the fluid pressure actuated cylinder that controls the valve (usually associated with the carbureter) such as shown in FIGURE 1. This view illustrates a modified embodiment of the construction and form for the levers, and also illustrates another embodiment of lever means that imparts the movement from the brake lever, that advances the piston rod and piston that develops the fluid pressure in the master cylinder, which pressure is communicated to the wheel brake cylinders.

FIGURE 4a is a fragmentary view and is an end view of the lever means shown in FIGURE 4 projected onto a plane parallel with the axis of the master cylinder.

FIGURE 5 is another fragmentary view of a diagrammatic nature to illustrate two positions of the piston rod of FIGURE 4, the starting position and the position near the end of he compression stroke.

Referring now to the parts, and particularly to FIGURES 1 and 2, it should be stated that the mechanism shown in these views, as far as possible, employs certain elements at least as regards the means for developing pressure in a master cylinder for activating the customary or conventional wheel brake cylinders mounted on the individual wheels for operating their brakes.

However, the combination of elements does disclose two systems constituting an accelerator system, and also a brake system in an organization operating to automatically inhibit the performance of the accelerator system when the brake lever is actuated to apply the brakes of automobile or car.

In FIGURE 1, which shows the mechanism at rest, that is with the parts in a relation in which the accelerator pedal or lever is in the position it would have when the motor of the car is idling.

Referring now particularly to FIGURE 1, the reference numeral 1 indicates the floor board of a car which in this case is composed of sheet metal and is provided with an elongated opening 2 which is struck out of the body portion 1a of the floor board which is usually disposed at an angle of about 45 degrees from the integral lower portion 3 of this floor body, which lies in a horizontal plane.

The parts mounted in the opening 2 shown here are of our invention, and preferably includes an angle-form bracket 4 functioning as a frame member, the lower part or flange 5 of which has an integral lug 6 supporting a horizontal pin 7, for supporting a casting 8 that includes a pressure-developing device such as the cylinder 9 which in the present instance is integral with a reservoir 10 for oil or any suitable fluid or liquid suitable or adapted for developing a pressure within the cylinder 9 and communicating the pressure to another pressure actuated device such as a cylinder 11 carried on the car for controlling the valve through which the fluid for the motor passes.

In the present instance, the valve 12 referred to is shown in dotted line as a butterfly valve, such as usually is mounted in the carburetor 13.

In order to supply the fluid under pressure to the actuating cylinder 11 a pressure developing cylinder 14 is provided, the upper end of which as shown in FIGURE 1 is secured to the upper flange 15 of the angle bracket 4.

This cylinder carries a piston 16 shown in dotted lines and has an inserted threaded guide neck 17 which is screwed into a threaded opening 18 in the flange 15.

A piston rod or stem 19 attached to the piston is guided through a guide bore in the threaded neck 17. The upper end of the stem 19 carries a roller 20 with a flat face, and on the upper side of this roller normally rests a tip 21 or free end of an accelerator lever 22. This lever 22 is pivotally attached by a pivot pin 23 to the upper side of the brake lever 24, which lever seats on a gasket 25 that acts as the upper wall of the reservoir 10.

The brake lever 24 is preferably composed of spring steel, for example, high carbon steel.

In mounting the pivot pin 23 (as indicated in FIGURE 1), if desired, an eye bolt 26, having a threaded shank screwed into a threaded socket in the casting 10 may be employed. The brake lever 24 is wide enough to cover the area of the opening, and around the edge a sufficient number of countersunk screws 27 are provided. As indicated in FIGURE 1 the upper end of lever 24 rests upon the fixed part 5, but FIGURE 2 shows it raised clear of it as would be in the completely depressed position of the brake lever.

A "short-coil" spring 28 is provided at the pivot pin 23 with straight extensions 28a at its ends that lie against the underside of the accelerator pedal and the upper side of the brake lever 24.

Stop means is provided for limiting the action of the spring 28. In the present instance a stop is provided by forming an integral bent curved extension 30 at the lower end of the accelerator lever.

When the end of this extension 30 is resting on the upper face of the brake lever 24, the lever or accelerator pedal is at the limit of its upward movement. And this may operate also to limit the movement of the piston 16 in its return stroke. If desired, a conical coil spring, such as shown in FIGURE 4, may be mounted centered around the projecting portion of the piston rod, thereby providing means for returning the piston, and the adjacent head of the cylinder 1a can function as its own stop.

The accelerator lever 22 is provided with a tread member or pad 31 on its upper face which may be cemented to the lever, as shown in all of the figures of the drawing.

Referring again to FIGURE 1, when the accelerator lever 22 is depressed the piston 16 is advanced in the cylinder 14 and this of course raises the pressure within it, and a considerable quantity of the operating fluid is discharged through a hose connection 32, one end 33 of which is secured to the forward head of the cylinder 14 and the other end of which is connected at 33 to the cylinder 11 already referred to. This of course advances its piston, the piston rod 34 of which extends through the left head of the cylinder 11 as viewed in FIGURE 1, and is attached with a pin in a slot 35 in the end of an actuating arm of a bell crank lever 36; the other arm of this lever is connected by means of a link 37 to a lever 38 which is operatively connected on the axis of the valve 12. Of course, when the piston rod 34 moves toward the left the link 37 will be pulled down and that will move the throttle valve further toward its open position.

The hose 32 in practice should be capable of withstanding the relatively low internal pressure that would be required to actuate the piston in the cylinder 11 as, of course, it would require very light force to rotate the valve 12 on its medial axis. The valve illustrated is associated with a carburetor having its outlet 39 into the part of the carburetor where the carburetion of the incoming air at the upper end of the unit becomes charged with the fuel.

Referring again to FIGURE 1, the reservoir 10 for the hydraulic medium that is the operating fluid for the master cylinder 9 serving the brake cylinder at the wheels, it will be noted that the upper end of this reservoir is provided with an extension 40. This extension is tubular and its side wall is provided with a removable threaded cap 41 that can be removed to replenish the oil or other liquid or fluid employed in the brake system.

The upper end, however, of the tubular extension 40 is closed and is drilled transversely on a horizontal axis to provide an eye to enable it to be pivotally supported on a transverse pin about which the cylinder 9 can be rotated when the brakes are being applied, by pressure exerted by the driver's heel on the lower end of the brake lever 24.

When the brakes are being applied in this way, of course, the cylinder and its reservoir will swing down in an arc having its center at the pin 7, and assume a position such as illustrated in FIGURE 2. In this position the piston rod 43 will have advanced its piston 44 to the lower end of the cylinder 9 and will have developed pressure in the operating fluid in the lower end of the cylinder 9 and expel a quantity of the operating fluid into the hose connection 45, one end of which is connected to the lower head of this cylinder.

The piston rod 43 extends through the opening 46 at the upper end of the cylinder as shown in FIGURE 2, its upper end being provided with an eye 47 that receives an anchor 48 carried by the lower edge of the flange 5 of the bracket.

In connection with the parts now being referred to it should be understood that this type of cylinder and piston with its rod is used in standard practice, and the inner end of the piston rod has a ball and socket connection 49 (shown in dotted lines) to the upper side of the piston, and when the parts are in their state of rest the piston rod 43 is slightly inclined with reference to the axis of the cylinder. This relation is indicated in FIGURE 1, but when the brakes are applied and the cylinder takes the position indicated in FIGURE 2, this inclined relation is absent and the axis of the piston rod substantially coincides with the axis of the cylinder. This is well because at this time the piston rod is receiving its greatest thrust force to develop the highest degree of pressure in the brake system to apply the brakes.

When the mechanism just described is in its state of rest as depicted in FIGURE 1, the cylinder and its attached parts will be held by a coil spring 50 attached at one end to the lower end of the cylinder and at the other end to an anchor bracket 51 attached to the lower face of the horizontal extension 3 of the foot board 1. In this position the spring has enough force to hold the lower end of the brake lever 24 against a stop bracket 52, the base 53 of which may be welded or otherwise secured to the upper face of the extension 3 adjacent the lower edge of the opening 2. As a considerable internal pressure is developed in the hose connection 45, this hose should be armored hose to resist the pressure or may be constructed of copper tubing with one or more short coils wherever necessary along its length to enable it to be connected into the main tube that supplies the branches that deliver the high pressure operating liquid to the wheel brakes.

Referring now to FIGURES 3 and 3a, instead of using the pivot pin 23 for mounting the accelerator lever 22 on the upper side of the brake lever 24, we prefer to adopt a construction for these levers that avoids using pivot pins for either of these levers, and instead of the pins we prefer to employ a modified form of brake lever 24a which is characterized by providing the flat plate body of this lever with an integral bow 54; and the upper end of this lever beyond the bow has a flat extension 55 to seat on the upper face of the upper flange 15a of the angle bracket frame member, to which it is attached by means of screws or bolts such as the bolt 56.

In constructing the two levers, that is to say, the brake lever 24a and the accelerator lever 22a we prefer to form them both from a blank of high grade steel of considerable resiliency. At the portion of the blank that is to be the free end of the brake lever 24a, we employ a die to cut through the metal from its lower tip to a point 57. In other words, the metal is broken through by two parallel slits between which a tongue is formed and this tongue is then bent around to form a bight 58 integrally connecting it to the material of the brake lever. Beyond this bight the material is left in straight condition and of sufficient length to enable its tip 21a to rest normally on the roller 20a on the upper end of the piston rod 19a.

After giving the blanks from which these two levers are formed the shapes and features referred to, the two integral levers should be tempered to give them the desired resiliency.

The master cylinder 59 in the present instance is preferably mounted on the upper side of the flange 5a of the frame angle bracket already described, for which purpose the lower end of the cylinder is provided with a flange 60 to receive securing bolts or screws 61. A piston rod 62 in this case also has a ball and socket connection 63 with its piston 64. In order to advance this piston when applying the brakes, the free end of the piston is forked and the forks are provided with aligning eyes to enable them to be attached to a pivot pin 65 which is mounted on a lever 66 pivotally supported on a pin 67 at the upper end of a pedestal bearing 68 mounted on the bottom plate 69 of a box form casing 70 that operates as a housing for all of the mechanism being described except the two operating levers for applying the brakes and for controlling the piston rod 19a operating the valve of a carbureter unit such as shown in FIGURE 1.

The lever 66 above the pin 65 is provided with a forked upper end presenting a starting fork 71 to initiate the compression movement in the cylinder 59, and a second fork 72 located to the right of the fork 71 as illustrated in FIGURE 3 and which may be considered a follower fork when the lever fork 71 moves to the left when the brake lever 24a is depressed to apply the brakes. Each of these forks 71 and 72 is provided with rollers 73 and 74, respectively. When the parts are at rest the roller 73 of the fork 71 is in contact with the under face of the brake lever 24a. Its roller 73 is held in contact with the underside of the brake lever 23a through the agency of a coiled spring 75, the lower end of which is anchored to a pin 76 carried in a short pedestal 77 mounted and secured on the upper face of the bottom plate 69 of the casing 70, as is the pedestal 68 already described.

When the brake lever is pushed down forcibly by the heel 78 a tapered rubber pad 79 below it and the upper end of fork 71 moves along an arc 80 (see FIG. 3) and as it does so the pin 65 further down on the lever 66 also describes an arc at 81 about the cross pin 67 that supports the lever 66.

In other words, an initiation occurs of the compression movement of the piston 64, but if it were attempted to complete the compression movement of the piston 64 it would be necessary for the brake lever 24a to push the upper end of the fork 71 past the plane of the flange 5a; and as it is impossible to do this it is necessary to form an opening 82 to provide clearance for the upper end of the fork 71 and its roller 73. And in view of the fact that unless the upper end of the fork 71 is offset laterally the fork 72 which would follow the swing of the fork 71 in case it should be given an excessive movement by the complete displacing of the brake lever 24a. In other words, as the two forks 71 and 72 swing toward the flange 5a, the roller 74 will start to ride along the under face of the lever 24a and while this occurs the pin 65 will move the piston rod 62 from its inclined position at the start of this movement, being advanced to the position 65a in which the axis of the piston rod 62 coincides with the axis of the master cylinder 59.

As the piston 64 advances and as soon as it crosses a port 83 leading from the cylinder into the reservoir 84 the pressure of the fluid or liquid in the master cylinder rises to the higher and final working pressure for the wheel brake cylinders which are supplied with liquid under pressure through a hose 85.

This hose should be capable of safely carrying a working pressure that should be applied when the brakes are put on.

When the lever 24a is depressed it will swing down from its normal plane (45 degrees from the horizontal) and the sole 86a will be moved to substantially the position in which it is shown in FIGURE 4.

As this movement occurs the tip 21a of the accelerator lever 22a will be moved clear of the roller 20a so that the contact of the tip of the sole with the roller 20a will be complete. In other words, the accelerator lever 22a will be inhibited as a means for immediately actuating the stem or piston rod 19a that would have otherwise raised the pressure of the operating fluid in the accelerator cylinder 86.

However, in normal driving when the brakes are not being applied the depression of the accelerator lever 22a will activate the accelerator cylinder 86 and hose 87 which increase the pressure in the pressure cylinder 11, as shown in FIGURE 1, and thereby control the closing of the valve in the carburetor that is admitting operating air to the carburetor. In ordinary driving when the brake is applied from time to time by pressure confined to the location of the driver's heel 78, there is little danger that could arise from the contiguous location of the tip 21a to the piston rod 19a. This is avoided by providing a small spur 87a that operates as a stop as shown in FIGURE 4, when it strikes the upper face of the brake lever 24a.

At the rear, and lower end of the brake lever a concave heel guard 88 supports the shoe 89 of the driver in its proper position for operating the accelerator lever at the toe, and the brake lever 24a at its heel.

Referring now to FIGURE 4, the relative positions of the two levers 22a and 24a is the same, but in this view we illustrate the use of "pivot pin" 89 for mounting the brake lever 90 on the upper flange 15 of the angle bracket 4. And a pivot pin 91a connects the lower end of the accelerator lever 91 to the upper side of the brake lever 90.

A spring 92 similar to the spring 28 shown in FIGURE 1, normally holds the accelerator lever elevated at an angle such as shown in FIGURE 3.

The lever means 95 for imparting movement from the brake lever 90 to the piston rod 93 of the master cylinder 94 has an inclined upper body extending substantially parallel to the plane of the brake lever; when depressed to the point indicated in FIGURE 4, and has an extension on the upper side carrying a roller 96 that runs on the under side of the brake lever. The lower end of the body of this lever means 95 has an integral forked extension composed of four parallel forks 97a, 97b, 97c, 97d, with a main slot 98 carrying a through pin in the form of a bolt the ends of which are threaded to carry two follower nuts 100 seating on washers as shown in FIGURE 4a.

The end of the piston rod 93 has an eye through which the bolt 99 passes to enable the movement of the lever means around its pivot to advance the piston in the master cylinder 94.

A cone-shaped spiral spring 101 seating on the adjacent head of the master cylinder 94 at its base and on the eye 99a, that carries the pin 99 keeps the lever means with the roller 96 pressed against the under face of the brake lever 90, and in this way acts as a return spring for the brake lever.

Referring now to FIGURE 5, this view is included to illustrate that the slot employed in the lever means 102 may be in the form of an S-shaped slot 98a. This gives an arc form edge 103 with its concave face pushing a pin 99a at a point of tangency lying on the axis 93a of the piston rod. This is as it should be because at the conclusion of the compression stroke the compressing force should be applied where it is most effective in moving the piston forward, completing the stroke where the resistance is the greatest.

When the brake lever 90 is in its position of rest its free end 88a is resting against the underside of a stop 88b secured to the upper side of the extension 3a of the floor board 1a.

When the vehicle is running forward, the heel of the shoe as shown in FIGURE 4, at 89 is socketed on the heel pad 79 with its forward edge up against the end of the curved stop 30a.

If the construction shown in FIGURE 3 is being used on the car the heel 78 will have its forward edge or face socketed against the convex rear face of the bight form spring 58.

Referring now to FIGURES 1 and 2, the brake lever 24 may be stiff enough to maintain itself up against the stop 52 when the mechanism is at rest, as shown in FIGURE 1, but as a precaution to assume that this lever will always be in this position shown in FIGURE 1, until the brake is being applied by down pressure at the heel, the coil spring 50 may be also employed.

If desired, a coil spring similar to the spring 101, but longer, may be applied around the piston rod 62 which spring at its base would thrust against the adjacent side of the flange 5a, with its outer end thrusting against the joint that includes the cross pin 65.

Many other embodiments of this invention may be resorted to without departing from the spirit of the invention.

We claim as our invention and desire to secure by Letters Patent:

1. In a combined control mechanism for the carburetor and for the brake mechanism for an automobile, adapted to be controlled by the same foot of the driver, the combination of a brake-actuating lever with means for pivotally supporting thte same in an inclined position forward of the driver's position, and so that the said lever can rock about a transverse axis adjacent its upper end, while its lower end is in a position to receive pressure from the heel of the driver's foot; an actuator stem adapted to be connected to the carburetor, with means for guiding the stem forward; an accelerator lever aligned with the brake-lever, and with the lower end of the accelerator lever supported on the upper face of the brake-lever, with the upper tip-portion of the accelerator lever lying adjacent the end of the stem and projecting across the same so that pressure of the toe-portion of the driver's shoe can actuate the stem to advance and control the carburetor to accelerate the automobile, all of said parts cooperating when the driver's heel depresses the brake-lever, to withdraw the said tip-portion of the accelerator lever, from the end of the stem, thereby preventing any accidental acceleration of the automobile while the braking of the automobile is maintained.

2. A combined control mechanism for the carburetor and for the brake mechanism for an automobile according to claim 1, including a first fluid pressure cylinder, actuated by the said stem, and a second fluid pressure cylinder actuated by the first cylinder and adapted to be connected to the carburetor for controlling the quantity of gas passing from the carburetor, and in which the brake mechanism is controlled by the same, and in which said first named cylinder has a piston with a piston rod extending therefrom, its piston operating to compress the fluid contained therein for actuating the second named cylinder.

3. A combined control mechanism for the carburetor and for the brake mechanism for an automobile according to claim 2, including a fixed part supporting the first cylinder, and in which the brake lever comprises a resilient plate, one end of which is attached on the said fixed part to rock around the point of attachment as on an axis when the brake lever is depressed.

4. A combined control mechanism for the carburetor and for the brake mechanism for an automobile according to claim 2, including a fixed part adjacent the first cylinder, and in which the brake lever comprises a resilient plate, one end of which is attached on the fixed part to enable the body of the resilient plate to flex and rock around the point of attachment as on an axis when the brake lever is depressed, said brake lever having its said attached end rigidly secured to the said fixed part, and having a bight formed therein adjacent said point of attachment, about which the brake lever rocks to apply the brakes.

5. A combined control mechanism for the carburetor and for the brake mechanism for an automobile according to claim 2, including a fixed part adjacent the first cylinder, and in which the brake lever comprises a resilient plate, one end of which is attached on the fixed part to rock around the point of attachment as on an axis when the brake lever is depressed, said brake lever having its attached end rigidly secured to the fixed part, and having an integral curved bow formed therein adjacent its point of attachment, presenting a convex, and a concave face, and about which the brake lever rocks to apply the brakes; and in which the accelerator lever is integral with the brake lever, and connected to the same by a bight, the concave side of said bight facing toward the free end of the accelerator lever, a return spring, and means cooperating therewith for normally holding the brake mechanism in its released position, said spring capable of maintaining the brake lever in its normal position of rest when the accelerator lever is depressed to accelerate the motion of the automobile.

6. A combined control mechanism for the carburetor and for the brake mechanism for an automobile according to claim 1, adapted to cooperate with wheel brake cylinders, wherein the stem guide means includes a fixed frame, means actuated by the movement of said stem for controlling the quantity of fuel gas passing from the carburetor, and including a master brake cylinder containing fluid to be compressed therein for delivery to the wheel brake cylinders, means for mounting said master cylinder on frame, and in which the means for actuating the brakes by the brake lever includes a piston in the master cylinder, and lever means activated by the brake lever for advancing said piston to develop pressure in the master cylinder and wheel cylinders, said lever means comprising a lever member mounted on the frame to rock, and operatively connected between the brake lever and said piston; and in which the accelerator lever is normally resting at its free end on said guided stem, and is connected to the brake lever so that when the brake lever is depressed to apply the brakes, the accelerator lever becomes withdrawn from its contact with the said guided stem.

7. In a control mechanism for an automobile according to claim 1, including a butterfly valve from which the fuel flows to the motor, a fluid-pressure actuated device connected to the valve for moving it toward the open position, a fluid pressure developing means connected to the fluid activated device, for communicating pressure to the same, and a control member actuated by said stem for raising the fluid pressure in the fluid pressure activated device.

8. A combined control mechanism for the carburetor and for the brake mechanism for an automobile according to claim 6, in which the accelerator lever is integral with the brake lever, and connected to the same by a resilient bight of the material out of which the levers are formed, and in which the said lever-means for imparting movement to the piston has two forks including a forward fork normally in contact with the brake lever for initiating the advancing movement of the piston rod; and including a second fork located so as to be engaged by the brake lever, after the discontinuing of its contact with the first fork, for completing the final movement of the piston rod and the piston's compression movement.

9. A combined control mechanism for the carburetor and for the brake mechanism for an automobile according to claim 8, in which the fork that cooperates to initiate the movement of the said piston and its piston rod, is offset laterally to provide clearance for itself, and the follower fork that is engaged thereafter by the brake lever, completes the final compression stroke of the piston rod and piston.

10. A combined control mechanism for the carburetor and for the brake mechanism for an automobile, according to claim 1, including a frame member comprising an angle bracket with two flanges; and in which the accelerator mechanism includes an activating means for the same mounted on one of said flanges, and in which the master cylinder for the brake mechanism is mounted on the other flange of said angle bracket.

11. A combined control mechanism for the carburetor and for the brake mechanism for an automobile according to claim 6, including a two-forked lever means, comprising a fork located so as to be first engaged by the brake lever, for initiating the advancing movement of the piston and piston rod of the master cylinder, and in which a follower fork is thereafter engaged by the brake lever to complete the compression movement of the piston of the master cylinder.

12. A combined control mechanism for the carburetor and for the brake mechanism for an automobile according to claim 11, in which a flange member comprising an angle bracket with two flanges is provided; and in which the accelerator mechanism includes an activating means for the same mounted on one of said flanges and in which the master cylinder for the brake mechanism is mounted on the other flange of said angle bracket; and wherein a two-forked lever means comprising a fork located so as to be first engaged by the brake lever for initiating the advancing movement of the piston and piston rod of the master cylinder, and in which a follower fork is thereafter engaged by the brake lever to complete the compression movement of the piston of the master cylinder, and in which the flange that carries the master cylinder has an opening through the same to provide clearance for the offset end of the fork that is first engaged by the said brake lever.

13. A combined control mechanism for the carburetor and for the brake mechanism for an automobile according to claim 1, which includes a frame member, and including lever means actuated by the brake lever and pivotally supported on the frame member, and extending out forward of the brake lever, said lever means having a contact extension projecting toward the said brake lever, so as to be engaged by the same; and including a master cylinder with a piston rod, said lever means having forks operatively connected to the end of the piston rod of the master cylinder for advancing the same to raise the pressure in the master cylinder when the brake lever is depressed to apply the brakes; and including a ball and socket joint between the inner end of the piston rod and the piston of the master cylinder.

References Cited in the file of this patent

UNITED STATES PATENTS

| | | |
|---|---|---|
| 2,087,205 | Polete | July 13, 1937 |
| 2,165,320 | Weiss et al. | July 11, 1939 |
| 2,203,777 | Detmers | June 11, 1940 |
| 2,300,136 | Rockwell | Oct. 27, 1942 |
| 2,373,028 | Kennedy | Apr. 3, 1945 |
| 2,411,167 | Perry | Nov. 19, 1946 |
| 2,725,962 | Dillingham | Dec. 6, 1955 |

FOREIGN PATENTS

| | | |
|---|---|---|
| 475,449 | Canada | July 24, 1951 |
| 64,713 | France | June 29, 1955 |
| 936,793 | Germany | Dec. 22, 1955 |